United States Patent [19]

Collins

[11] Patent Number: 4,909,461

[45] Date of Patent: Mar. 20, 1990

[54] STUBOUT BAR

[75] Inventor: John D. Collins, Sturgeon Bay, Wis.

[73] Assignee: C & S Manufacturing Corporation, Sturgeon Bay, Wis.

[21] Appl. No.: 200,409

[22] Filed: May 31, 1988

[51] Int. Cl.⁴ .............................................. F16L 3/22
[52] U.S. Cl. ..................................... 248/68.1; 248/57
[58] Field of Search ................ 248/68.1, 57, 74.1, 248/71, 65, 62, 56; 165/162, 172; 4/192

[56] References Cited

U.S. PATENT DOCUMENTS

| 3,021,103 | 2/1962 | Beyerle | 248/57 |
| 3,104,087 | 9/1963 | Budnick | 248/57 X |
| 4,407,478 | 10/1983 | Hodges | 248/62 X |
| 4,550,451 | 11/1985 | Hubbard | 4/192 |
| 4,605,059 | 8/1986 | Page | 165/163 |

FOREIGN PATENT DOCUMENTS 1492552  7/1967  France ............................. 248/68.1

Primary Examiner—J. Franklin Foss
Attorney, Agent, or Firm—Wheeler Law Firm

[57] ABSTRACT

A stubout bar having notches instead of holes for holding plastic or metal pipes.

1 Claim, 2 Drawing Sheets

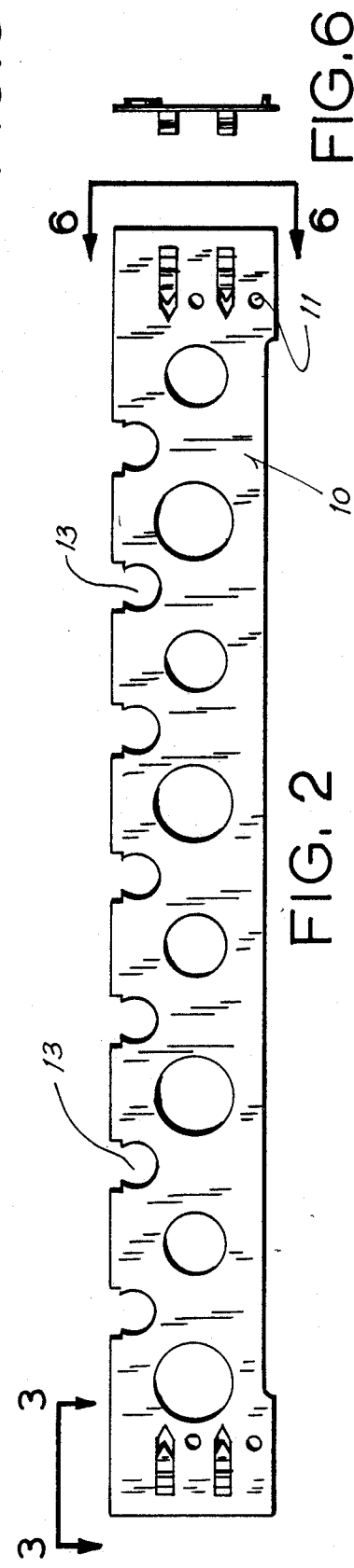
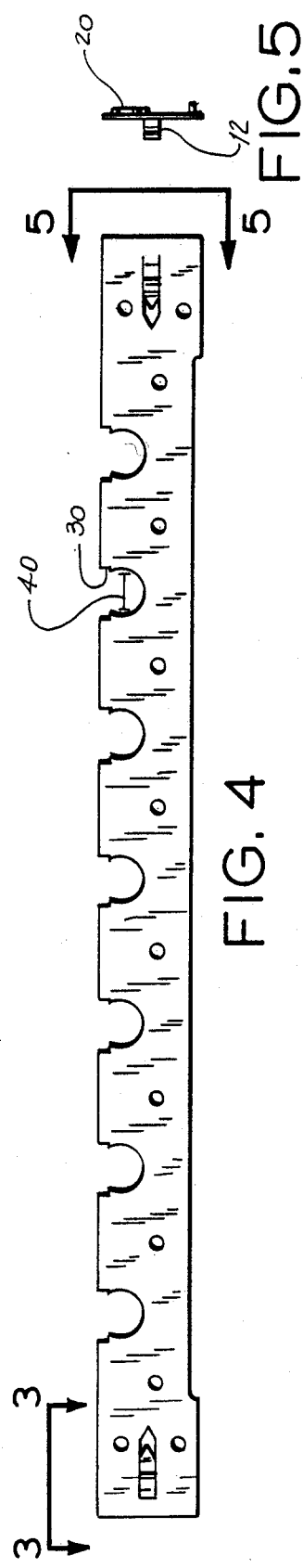
FIG. 2
FIG. 4
FIG. 3
FIG. 5
FIG. 6

STUBOUT BAR

BACKGROUND OF THE INVENTION

The present invention relates to the field of home construction generally and plumbing specifically. Stubout bars are used to support pipes that carry water into a bathroom or kitchen or some other area of the house where water is needed. During construction of the house the bars are attaended to studs in the wall of the house.

Traditionally these bars have had holes cut in them and the pipes have been placed in these holes and soldered to the bars. This allowed the pipes to b brought in at a uniform height and maintained the required distances between each pipe as plumbing codes require. However, it does not allow the pipes that are to be soldered to be made out of any material other than metal.

The present invention uses notches instead of holes in the metal bar or strip. This allows the pipes to be easily snapped into place and held firmly without having to be soldered. Therefore, either plastic or metal pipes may be used. Also, metal pipes may still be soldered if that is what is desired. The inventor knows of no prior art which uses notches instead of holes. See, for example, U.S. Pat. No. 4,550,451 (Hubbard).

SUMMARY OF THE INVENTION

The present invention is a stubout bar. The bar uses notches instead of holes to support the pipes as they are brought into the house. The notches maintain the required distance between the pipes as do the holes, however, the notches provide an easy method by which the pipes may be put into place. The pipes may be snapped into the notches and are held securely by the unique design of the notch. The notch is designed to have an arcuate shape. The base of the notch is formed by a flange that comprises an arc of more than 180°. This arc, by means of its unique and simple design, pinches the pipe as it is snapped into place and firmly holds the pipe in place. Furthermore, when the pipe is metal the flange provides an excellent surface for soldering the pipe to the stubout bar should additional support for the pipe be required.

These and other benefits of the present invention will be apparent to one skilled in the art from the following description.

BRIEF DESCRIPTION OF THE DRAWINGS

FIG. 2 is a side view showing one of the brackets shown in FIG. 1.

FIG. 3 is an end view of one of the brackets shown in FIG. 1.

FIG. 4 is a side view on one of the brackets shown in FIG. 1.

FIG. 5 is an end view of the bracket shown in FIG. 4.

FIG. 6 is an end view of the bracket shown in FIG. 2.

DETAILED DESCRIPTION

Figure 1:
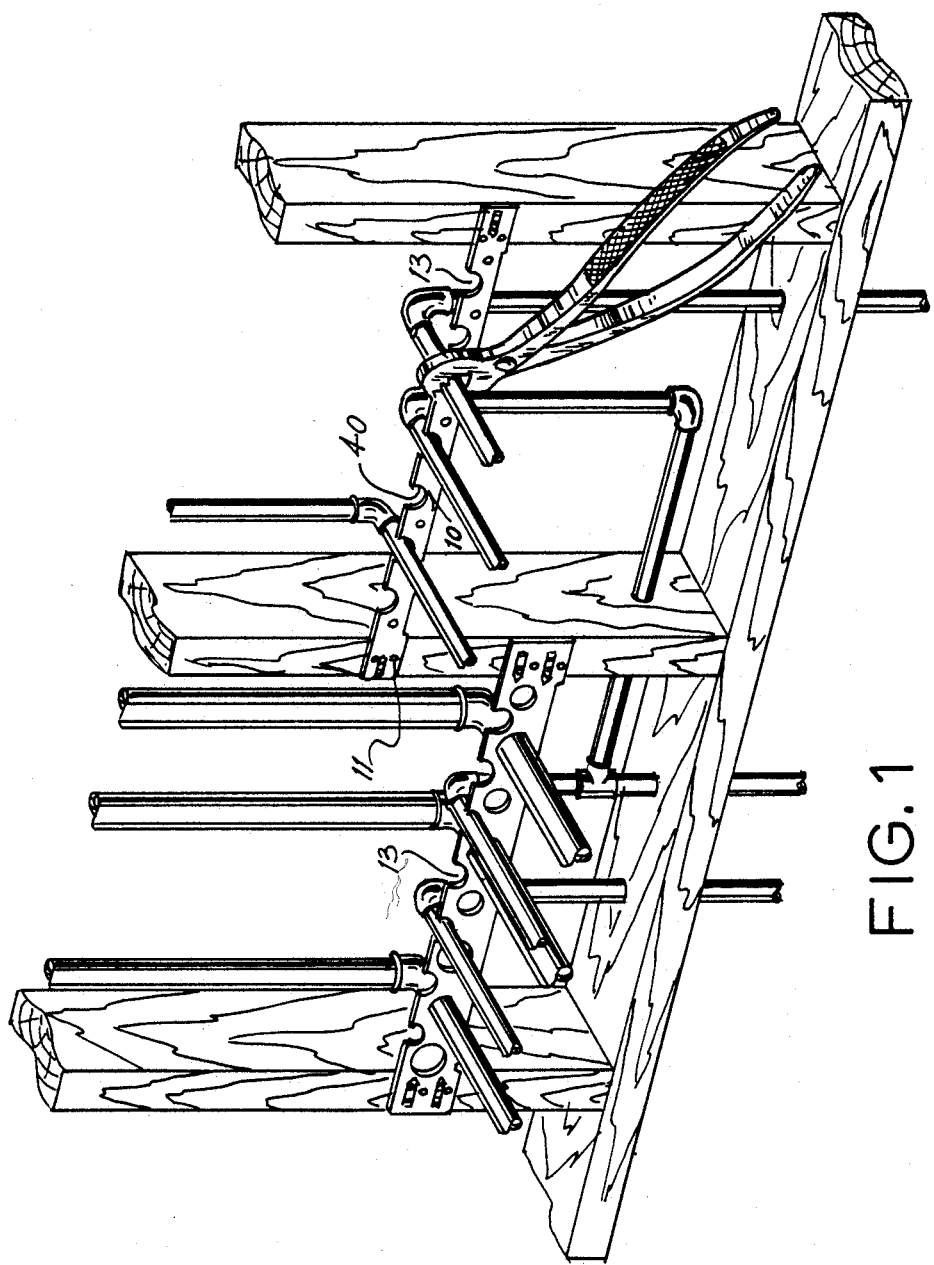
FIG. 1 is a perspective view of the metal bar.

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

As shown in FIG. 2, the invention comprises a rectangular metal bar 10 and a series of notches 13. The notches 13 are spaced as required by plumbing fixtures and are cut into long side 14 of the rectangularly shaped metal bar 10.

FIG. 4, shows the notch 40, a notch edge 30, and a flange 20. The flange 20 forms the base of the notch 40. The flange 20 is part of the notch 40 and forms a partial rig of slightly more than 180° in arc. Desirably it interferes just slightly with placing a standard sized pipe in the notch, but not enough to prevent the metal from yielding resiliently when the pipe is forced into place. Interference of 0.003 inch to 0.005 inch is correct for standard thickness stubout bars. The notch edge 30 is that portion of the notch 40 that is not covered by the flange 20. The notch edge 30 is located at the top of the notch 40 where the long side 14 of the metal bar 10 borders the space created by the notch 40 The combination of the notch edge 30, the notch 40, and the flange 20 forms the device of the invention whereby a pipe may be snapped into the notch 40 and held firmly in place by the flange 20. Furthermore, as illustrated in FIG. 5, the flange 20 provides a surface 21 which would allow the pipe to be soldered to the metal bar 10 if so desired.

FIG. 2 illustrates the metal bar 10. Specifically, FIG. 2 shows the location of the locating tabs 12 and the nail or rivet holes 11. FIG. 3 which is a view from line 3—3 of FIG. 2, show the orientation of the locating tabs 12 with respect to the metal bar 10. Once proper location for the metal bar has been determined, the locating tabs 12 may be hammered into the studs and permanently fasten the stubout bar 10 to the studs. If further support is needed or it is not desired to hammer the locating tabs 12 into the wall studs, nails or rivets may be driven through the nail or rivet holes 11 of the stubout bar 10 and the bar 10 may be attached by that method; whereby the placement of the pipes in the notches 13 may begin.

The foregoing is considered as illustrative only of the principles of the invention. Furthermore, since numerous modifications and changes will readily occur to those skilled in the art, it is not desired to limit the invention to the exact construction and operation shown and described.

What is claimed is:

1. A stubout bar comprising:

a solderable metal bar sized to extend between two supports in a building wall;

openings in said bar located and sized to receive fasteners securing said bar to said supports;

a plurality of notches extending in a linear series along the metal bar;

each said notch being arcuate in shape, the base of each said notch being a continuous flange which extends through an arc of slightly greater then 180°, said flange forming a segment of a circle of sufficient arcuate extent whereby a pipe may be snapped into the notch, the flange holding the pipe in place and providing a surface which may be easily soldered.

* * * * *